United States Patent
Franciosa et al.

(10) Patent No.: US 12,302,469 B2
(45) Date of Patent: May 13, 2025

(54) METHOD FOR DETERMINING THE THREE-DIMENSIONAL POSITION OF A PLURALITY OF LIGHTING DEVICES

(71) Applicant: LEDWORKS SRL, Milan (IT)

(72) Inventors: Marco Franciosa, Milan (IT); Andrea Tellatin, Milan (IT)

(73) Assignee: LEDWORKS SRL, Milan (IT)

( * ) Notice: Subject to any disclaimer, the term of this patent is extended or adjusted under 35 U.S.C. 154(b) by 136 days.

(21) Appl. No.: 18/018,424

(22) PCT Filed: Jul. 30, 2021

(86) PCT No.: PCT/IB2021/056953
§ 371 (c)(1),
(2) Date: Jan. 27, 2023

(87) PCT Pub. No.: WO2022/024053
PCT Pub. Date: Feb. 3, 2022

(65) Prior Publication Data
US 2023/0292422 A1    Sep. 14, 2023

(30) Foreign Application Priority Data

Jul. 30, 2020 (IT) ........................ 102020000018673

(51) Int. Cl.
*H05B 47/125* (2020.01)
*H05B 47/11* (2020.01)
(Continued)

(52) U.S. Cl.
CPC ........... *H05B 47/125* (2020.01); *H05B 47/11* (2020.01); *H05B 47/155* (2020.01); *H05B 47/19* (2020.01)

(58) Field of Classification Search
CPC .... H05B 47/125; H05B 47/11; H05B 47/155; H05B 47/19; Y02B 20/40; G06T 7/55
(Continued)

(56) References Cited

U.S. PATENT DOCUMENTS

| 2018/0173191 A1* | 6/2018 | Hillberg ............... G05B 19/402 |
| 2018/0329484 A1 | 11/2018 | Steedly et al. |

(Continued)

FOREIGN PATENT DOCUMENTS

| WO | 2017115326 A1 | 7/2017 |
| WO | 2019053688 A1 | 3/2019 |

OTHER PUBLICATIONS

International Search Report from PCT Application No. PCT/IB2021/056953, Dec. 1, 2021.

(Continued)

*Primary Examiner* — Ryan Jager
(74) *Attorney, Agent, or Firm* — Workman Nydegger

(57) ABSTRACT

A method is provided for determining the three-dimensional position of a plurality of individually controllable lighting devices, including: A) arrangement of the lighting devices in an environment; B) determination of positions of at least part of the lighting devices with respect to a single viewpoint, through the acquisition, by a camera, of a sequence of images of the environment in which the lighting devices is arranged and processing said sequence of images to obtain a two-dimensional model of the positions of at least part of said lighting devices; C) moving the camera to obtain at least one further two-dimensional model of the lighting devices according to at least one different viewpoint; D) processing the two-dimensional models to create a three-dimensional model. Activation of the lighting devices according to a (Continued)

determined lighting state based on said three-dimensional model is envisaged, the camera being moved based on said determined lighting state.

14 Claims, 6 Drawing Sheets

(51) Int. Cl.
*H05B 47/155* (2020.01)
*H05B 47/19* (2020.01)

(58) Field of Classification Search
USPC .......................................................... 315/297
See application file for complete search history.

(56) References Cited

U.S. PATENT DOCUMENTS

| | | | |
|---|---|---|---|
| 2020/0296814 A1* | 9/2020 | Franciosa | ............ H05B 47/125 |
| 2023/0247744 A1* | 8/2023 | Tellatin | .................. H05B 47/12 |
| | | | 315/76 |
| 2023/0292422 A1* | 9/2023 | Franciosa | ............ H05B 47/155 |
| 2023/0389165 A1* | 11/2023 | Tellatin | ................ H05B 47/155 |
| 2024/0057235 A1* | 2/2024 | Tellatin | ................ H04W 4/023 |

OTHER PUBLICATIONS

Search Report from corresponding Italian Application No. 102020000018673, Mar. 3, 2021.

\* cited by examiner

METHOD FOR DETERMINING THE THREE-DIMENSIONAL POSITION OF A PLURALITY OF LIGHTING DEVICES

The present invention relates to a method for determining the three-dimensional position of a plurality of individually controllable lighting devices.

SUMMARY

In particular, the method comprising the following steps:
A) arrangement of the plurality of lighting devices in an environment,
B) determination of the positions of at least part of the lighting devices with respect to a single viewpoint, through the acquisition, by means of a camera, of a sequence of images of the environment in which the plurality of lighting devices is arranged and processing said sequence of images to obtain a two-dimensional model of the positions of at least part of the lighting devices,
C) moving the camera in order to obtain at least one further two-dimensional model of the plurality of lighting devices according to at least one further viewpoint,
D) processing the two-dimensional models to create a three-dimensional model.

The present invention relates in particular to the sector of light decorations, in which the installation of a plurality of lighting devices is envisaged and a method is to be obtained to functionally control the activation of such lighting devices, preferably through the choice/creation of lighting programs such as to create aesthetically pleasing scenographies or lighting effects.

Generally, LED (Light Emitting Diode) devices are used as lighting devices, in particular LEDs called "addressable LEDs", "LED Chip" or "LED Pixel" which can be individually controlled by means of a communication bus.

An example of a lighting device control system is described in international patent application WO2017115326, the content of which is to be considered an integral part of the present patent application.

The control methods known in the state of the art are based on the detection of the position of the lighting devices.

Such methods commonly use a camera to acquire images of the plurality of lighting devices and have a disadvantage, as they are capable of determining the position of only the lighting devices detected from a single viewpoint, thus the distance from the viewpoint of the camera is not determined.

The result is that the processing of the acquired images tends to project the lighting devices on a single plane, without taking the depth into account: it is for all intents and purposes a detection of the positioning of the lighting devices in two dimensions.

Such a disadvantage has a significant effect on the execution of scenographies, since, especially with a large number of lighting devices, the fact of taking the depth and three-dimensionality of the installation of the lighting devices into account would improve the aesthetic appearance of the same scenographies.

To solve such a problem, some methods and systems known in the state of the art perform a reconstruction of the three-dimensional context through the execution of several simultaneous two-dimensional scans made from different points of view.

Simultaneous scanning obviously requires the use of different cameras, which must be suitably positioned so that each one can frame, from its respective angle, all the light points to be detected. Through triangulation procedures, the spatial coordinates of the identifiable lighting devices are then calculated.

However, such a procedure has several weaknesses. Firstly, in fact, it requires that all the light points be recognized by at least three different cameras in order to calculate the three-dimensional spatial position. This entails, especially in the case of elaborate scenographies, the need to position a large number of cameras or to renounce identifying important portions of the points to be detected. This determines, in addition to non-optimal results, a high expenditure in terms of time in positioning the cameras—which must necessarily be arranged before detection and which are therefore positioned only according to good sense.

Furthermore, it is often necessary to acquire more images than necessary in order to identify the spatial position of the lighting devices, and there is no guarantee of identifying the position of all the lighting devices.

Furthermore, in addition to an increase in time, the processing of many images requires a significant computation effort, which could contribute to further slowing down the calculation of the three-dimensional position of the lighting elements.

There is therefore a need which is not satisfied by the state of the art to obtain a method and a lighting system which allows to overcome the above-described disadvantages.

The present invention achieves the above objects by obtaining a method as described above, which includes the acquisition of the two-dimensional models by means of a camera in several consecutive steps, the generation of a three-dimensional model based on the acquired two-dimensional models and the activation of the lighting devices according to a determined lighting state based on the three-dimensional model calculated each time to guide subsequent acquisitions.

In fact, the method object of the present invention requires that each lighting device be identified in at least three acquired two-dimensional models.

The method therefore generates lighting configurations, i.e., activates the lighting devices according to different lighting states based on the three-dimensional model calculated from time to time in order to guide the movement of the camera, so that the acquisition of the next two-dimensional model is limited and targeted to the devices which have not yet been fully identified.

The method object of the present invention thus ensures the possibility of detecting all the lighting devices even in the case of particularly complex scenographies and allows to minimize the number of acquisitions of two-dimensional models necessary for the reconstruction of the three-dimensional position of the totality of the lighting devices.

Advantageously this method, unlike other methods known in the state of the art, does not make it necessary to detect all the lighting devices, but allows to limit the two-dimensional measurements to the devices actually necessary for the three-dimensional reconstruction.

This feature is also particularly advantageous since, as will be subsequently described, the acquisition can be performed either manually by a user or automatically, by means with autonomous mobility responsible for image acquisition, which automatically receive instructions to acquire, little by little, only the lighting devices which have not yet been fully identified.

The predetermined lighting state allows to diversify the lighting devices based on the acquired measurements so as to move the camera based on the lighting state, preferably, each time a two-dimensional model and the consequent three-dimensional model are processed.

In fact, as will be subsequently described, each two-dimensional model contributes to enrich and complete the final three-dimensional model, which is calculated from time to time, based on the two-dimensional models determined by each acquisition.

From what has just been described, it is evident that the method object of the present invention does not need to progressively process each two-dimensional model to obtain a three-dimensional model.

In fact, it is possible to envisage acquiring a series of two-dimensional models and processing them to obtain a three-dimensional model.

Therefore, the method will be able to memorize the two-dimensional models and process them, according to pre-established time intervals, to obtain the three-dimensional model.

For example, it is possible to acquire a predefined number of two-dimensional models, preferably greater than or equal to three, and generate the three-dimensional model.

Preferably, the two-dimensional models are obtained by virtue of the acquisition of a sequence of images of the environment where the plurality of lighting devices is arranged and the processing of said sequence of images.

An example of such a process is described in the aforementioned patent application WO2017115326.

According to a possible embodiment, the lighting devices are activated according to different predetermined lighting states useful for determining the spatial coordinates of each lighting device.

In particular, the lighting devices are activated according to different predetermined lighting states based on the number of acquired two-dimensional spatial detections.

The term two-dimensional spatial detection identifies a lighting device whose position has been previously detected in a two-dimensional model.

It is evident that such a solution allows to further optimize the number of acquisitions of two-dimensional models necessary for the reconstruction of the position of the lighting elements.

However, each scan adds information to the entire model, positioning each lighting device with greater certainty up to the determination of the spatial position of all the lighting devices, minimizing the number of two-dimensional model acquisitions necessary to obtain the desired result.

In order to further reduce and optimize the number of two-dimensional model acquisitions required, each acquisition can envisage comprising at least one previously detected lighting device.

For this reason, the camera is moved so that the two-dimensional models always contain at least one lighting device whose position has previously been detected in a two-dimensional model.

Preferably, in fact, as soon as the method indicates that the spatial position of a lighting device has been calculated, such a lighting device can be used as a reference point for calculating the spatial positions of the lighting devices of the subsequent acquisition.

As will be subsequently described, preferably downstream of each scan, a three-dimensional model of the lighting elements is reconstructed, so that the fact of optimizing the number of acquired images allows to significantly limit the computational burden required.

The lighting state can be related to any condition of the lighting devices, for example it can consist of an intermittent pulsation of the light emitted, or a certain light intensity or tone.

The lighting state can also take into account parameters which are not related to visual feedback, for example audio waves, infrared or ultraviolet radiation can be emitted.

Preferably, the lighting state relates to the emission of light according to a given colour.

The choice to activate the lighting devices according to different colours allows immediate feedback and easier interpretation, for the user or the automated means, to complete the mapping step of the system, i.e., the three-dimensional detection of the lighting devices.

According to a possible embodiment, following the acquisition of one or more two-dimensional models, a step is included for sending said model to a remote central unit, which generates a configuration of lighting states of each lighting device.

As will be subsequently described, it is preferable to perform a processing of the models acquired remotely, in order to calculate the three-dimensional position of the lighting devices, by means of processor means which allow to obtain a fast processing of such images.

Advantageously, the step of determining the positions of at least part of the lighting devices with respect to a single viewpoint comprises the following steps:
  during the acquisition of the sequence of images, switching on each lighting device of the plurality of lighting devices according to a different sequence, which sequence allows to uniquely identify each lighting device,
  analysis of the sequence of images to determine a spatial position of each lighting device in the environment.

In particular, the method described in patent application WO2017115326 is used to detect the coordinates of the lighting devices in order to create a two-dimensional model, the advantages of which are clearly described in the application itself.

Given the advantageous aspects of the method object of the present invention described above, the present invention also relates to a system which allows to perform such a method.

From a general perspective, the lighting system object of the present invention comprises:
  a plurality of lighting devices adapted to emit a light,
  a control unit adapted to individually control the switching on of each lighting device,
  a management unit of the lighting devices, which management unit comprises acquisition means configured to acquire a sequence of images of the environment where the plurality of lighting devices and processor means for processing the sequence of images are arranged.

The system components are configured to perform the method steps described above.

In particular, the management unit is configured to detect the position of at least part of the lighting devices based on the processing of the sequence of images and is configured to implement a system configuration step in which it determines a specific lighting state based on the positions of said lighting devices.

Furthermore, the control unit is configured to activate the lighting devices based on the given lighting state.

The system object of the present invention therefore comprises a management unit which sees to the acquisition of the images and the processing thereof.

Such activities can be integrated within a single device or distributed over several devices.

For example, according to a first embodiment, it is possible to envisage that the management unit comprises a portable user device, which includes at least one camera.

The portable user device can for example consist of a device such as a smartphone, tablet or the like which, in addition to seeing to the acquisition of the images, also has processor means for processing them and for calculating the position and three-dimensional position of each lighting device.

Alternatively or in combination, in order to obtain a higher computational speed, it is possible to envisage that the management unit comprises a remote unit, which remote unit is configured for processing the sequence of images.

Furthermore, such a remote unit is configured to communicate with said user device and/or said control unit.

The remote unit therefore receives the images, processes them, calculates the three-dimensional model, i.e., it calculates the spatial coordinates of all the lighting devices and communicates the instructions for switching on the lighting devices to the control unit, in order to switch them on in a diversified manner based on the three-dimensional model processed from time to time.

From what has been described above, it is evident that the user device can be an optional component of the system, the important aspect is that the processor means and the acquisition means are present.

For this reason it is possible to envisage that the system performs the acquisition through at least one automated vehicle.

Such an automated vehicle must have the ability to move in space and must have at least one camera to acquire images. The vehicle is moved so as to direct and frame the lighting devices for which spatial information is needed and to acquire the images necessary for the creation of the two-dimensional model from that viewpoint.

The control of such an automated vehicle can be autonomous, performed by an operator or through commands generated and sent by the remote unit.

Regardless of the type of command, it is possible to include artificial intelligence algorithms aimed at recognizing the lighting devices whose position has not yet been identified and at determining the best route to frame them appropriately.

Thereby, an automated mapping system of a plurality of lighting devices is obtained, which overcomes the physical limits of using fixed or manually operated frames.

One possible example of an automated vehicle is one or more drones.

BRIEF DESCRIPTION OF THE DRAWINGS

These and other features and advantages of the present invention will become clearer from the following description of some exemplary embodiments illustrated in the accompanying drawings in which.

DETAILED DESCRIPTION OF VARIOUS EMBODIMENTS

It is specified that the figures annexed to the present patent application indicate an embodiment of the method and system object of the present invention to better understand the specific advantages and features thereof.

Such an embodiment is therefore to be understood for the purpose of explanation and not limitation of the inventive concept of the present invention, i.e., that of obtaining a method for determining the three-dimensional position of different lighting devices, capable of detecting the three-dimensional position of each lighting device by means of the use of a single camera and limiting the number of images acquired in the environment where the lighting devices are arranged to the minimum necessary and ensuring the possibility of detecting the position of all the devices.

Figure 1A:
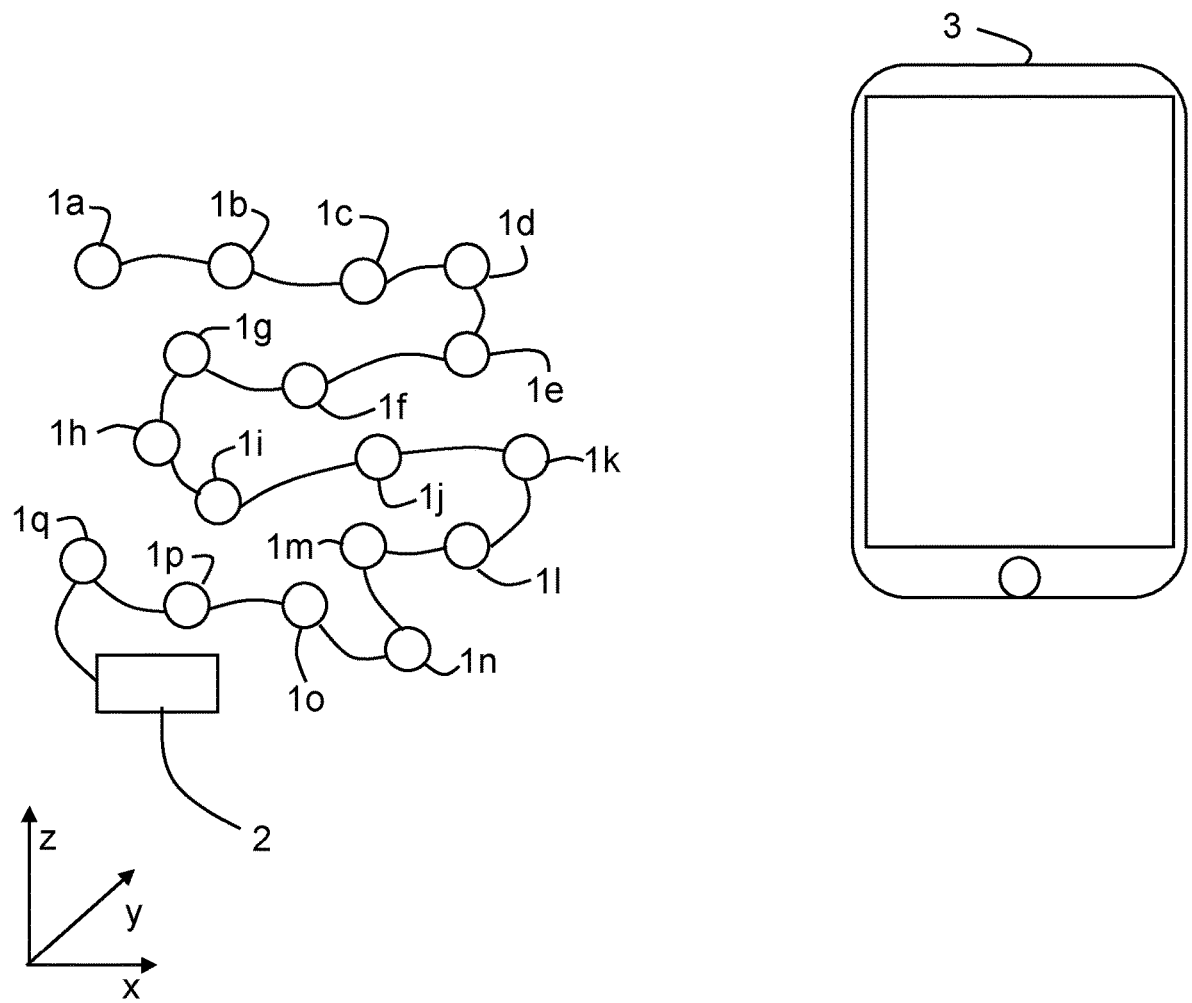
FIGS. 1a to 1e show, through a concept diagram, a possible embodiment of the method and the system object of the present invention.

With particular reference to FIG. 1a, the system comprises a plurality of lighting devices, indicated with the numbers 1a to 1q, which are electrically connected to each other through an electric wire known in the state of the art.

The lighting devices 1a-1q can for example consist of LEDs 1a-1q capable of assuming different colours.

The LEDs 1a-1q are connected to a control unit 2, adapted to individually control the switching on of each LED.

The control unit 2 can also be controlled by a user device 3, consisting of a device such as a smartphone or the like.

The smartphone 3 wirelessly communicates with the control unit 2 and their cooperation allows the execution of the method steps which will be subsequently described.

A similar system is described in patent application WO2017115326, the content of which is to be considered an integral part of the present invention.

It is specified that the LEDs 1a-1q could also be wirelessly connected to each other, just as the presence of the control unit 2 may not be necessary.

With particular reference to FIG. 1a, each LED 1a-1q has an address, i.e., an identification code, which allows it to receive command instructions from the control unit 2, which knows both the addresses of the LEDs 1a-1q, as well as, thanks to the electrical connection, the maximum distance which can exist between one LED and another.

For the sake of simplicity, a single string of LEDs 1a-1q is shown, but it is possible to include several LED strips, each with its own control unit, which communicate with the smartphone 3.

As shown thanks to the aid of the Cartesian axis system in the figures, the LEDs are arranged in an environment so as to create a three-dimensional structure, i.e., they are positioned on different planes, along the x, y and z axes.

The system just described is used to perform the method object of the present invention.

In particular, the smartphone 3, through its own camera, acquires a sequence of images of the lighting devices 1a-1q, in order to identify them, detecting their position.

Starting with the smartphone fixed in one point, a mapping of the LEDs 1a-1q is initially carried out, i.e., the two-dimensional position is identified, according to one or more of the methods described in patent application WO2017115326.

Preferably, the detection of the position of each LED 1a-1q is achieved through the generation of a LED activation sequence which includes setting different lighting states for each LED.

For example, the LEDs can be controlled so that they switch on, emitting lights of different colours.

In this case each LED can be adapted to emit light of different colours, so that during the acquisition of the plurality of images, each LED is controlled to generate a specific sequence of colours.

The result of such a mapping process is a two-dimensional model, in which the spatial coordinates have been detected of at least part, preferably all, of the LEDs, arranged on an imaginary plane.

A first two-dimensional model of the positions of the lighting elements is thus obtained.

Preferably, such an imaginary plane is oriented perpendicular to the half-line originating from the observation point, half-line perpendicular to the focal plane.

Once the two-dimensional mapping of the LEDs 1a-1q has been obtained, the smartphone 3 with its camera is moved so as to repeat the mapping from a different angle, and thus obtain the spatial coordinates of at least part, preferably all, of the LEDs, from another viewpoint.

A second two-dimensional model of the positions of the lighting elements is thus obtained.

The determination of the three-dimensional coordinates x, y and z, occurs through a triangulation procedure which is based on the two-dimensional models acquired by the smartphone 3 positioned in at least three different observation points.

In fact, to calculate the three-dimensional position of a LED, such a LED must be detected in at least three two-dimensional models taken from different viewpoints.

At the end of each acquisition of a two-dimensional model, the smartphone 3 processes a possible three-dimensional model based on the two-dimensional models collected, determining the three-dimensional positions of all the LEDs which are present in at least three two-dimensional models and identifying which LEDs have not yet been detected in a sufficient number of two-dimensional models. Following this operation, a command is sent to the control unit 2 so that it activates each LED according to a specific lighting state.

For example, it can be envisaged that the control unit 2 uses a predefined colouring for LEDs whose three-dimensional position has been determined and uses another colouring for LEDs which have only been identified in two and/or one and/or no two-dimensional models.

A green colour could be used for the LEDs whose three-dimensional position has been determined or which have been detected in three two-dimensional models, a yellow colour for the LEDs which have been detected in two two-dimensional models, an orange colour for the LEDs which have been detected in a single two-dimensional model and a red colour for the LEDs which do not appear in any two-dimensional models.

Figure 1B:
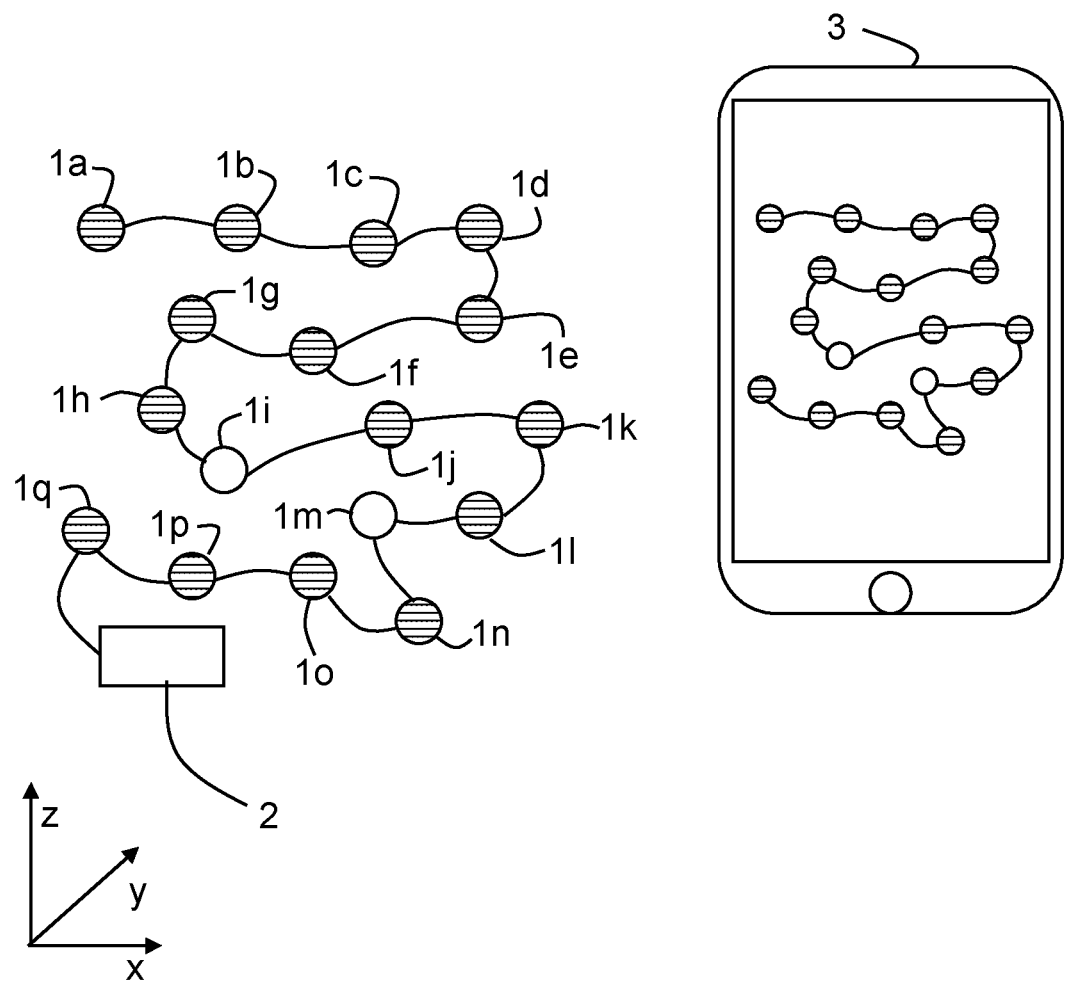
Figure 1C:
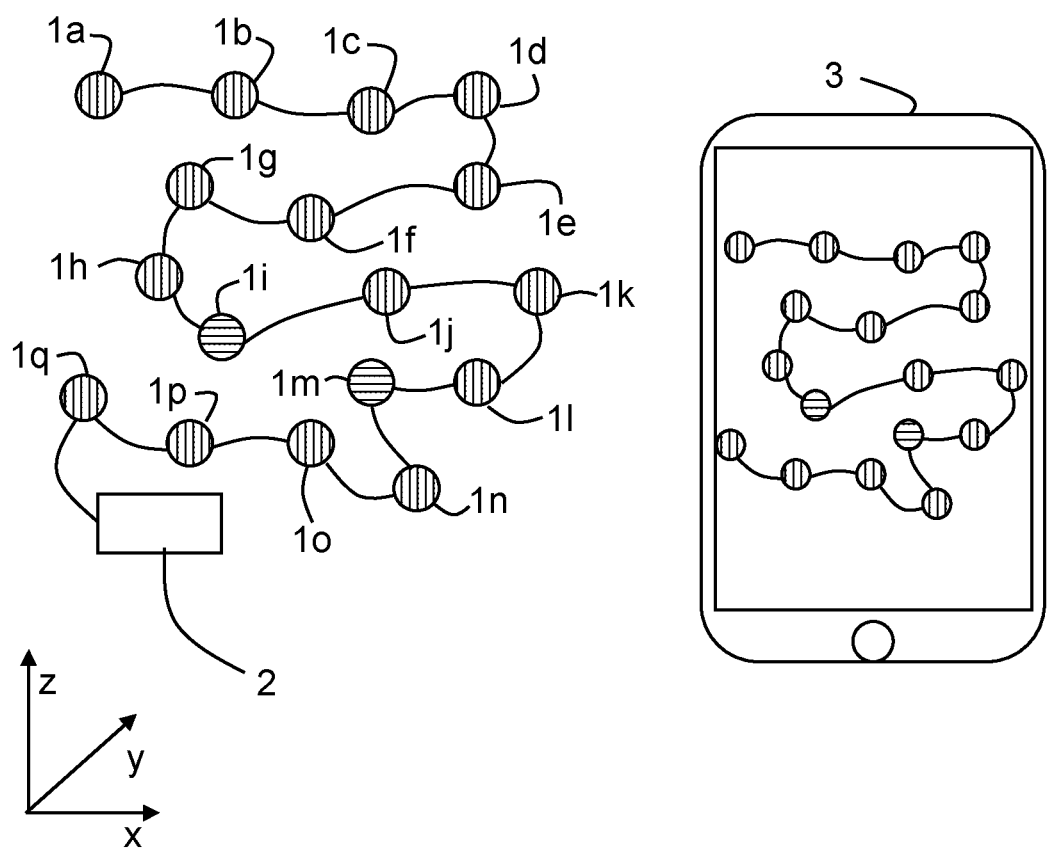
Figure 1D:
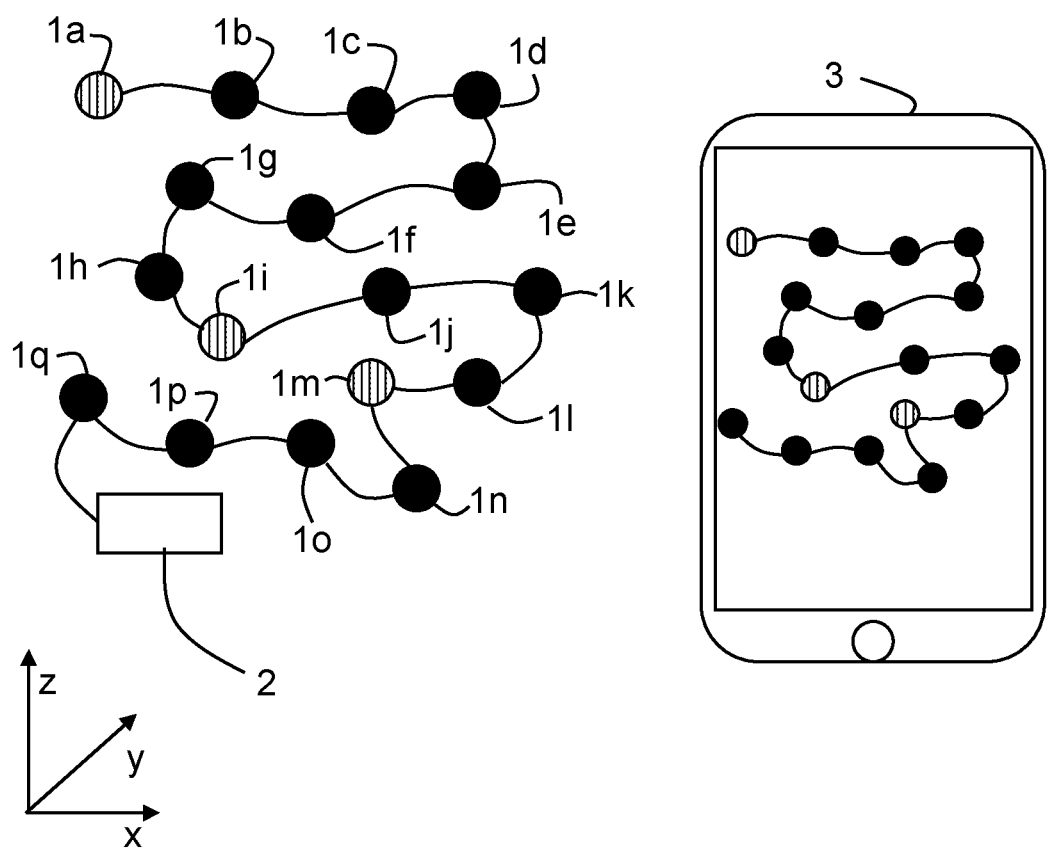
Figure 1E:
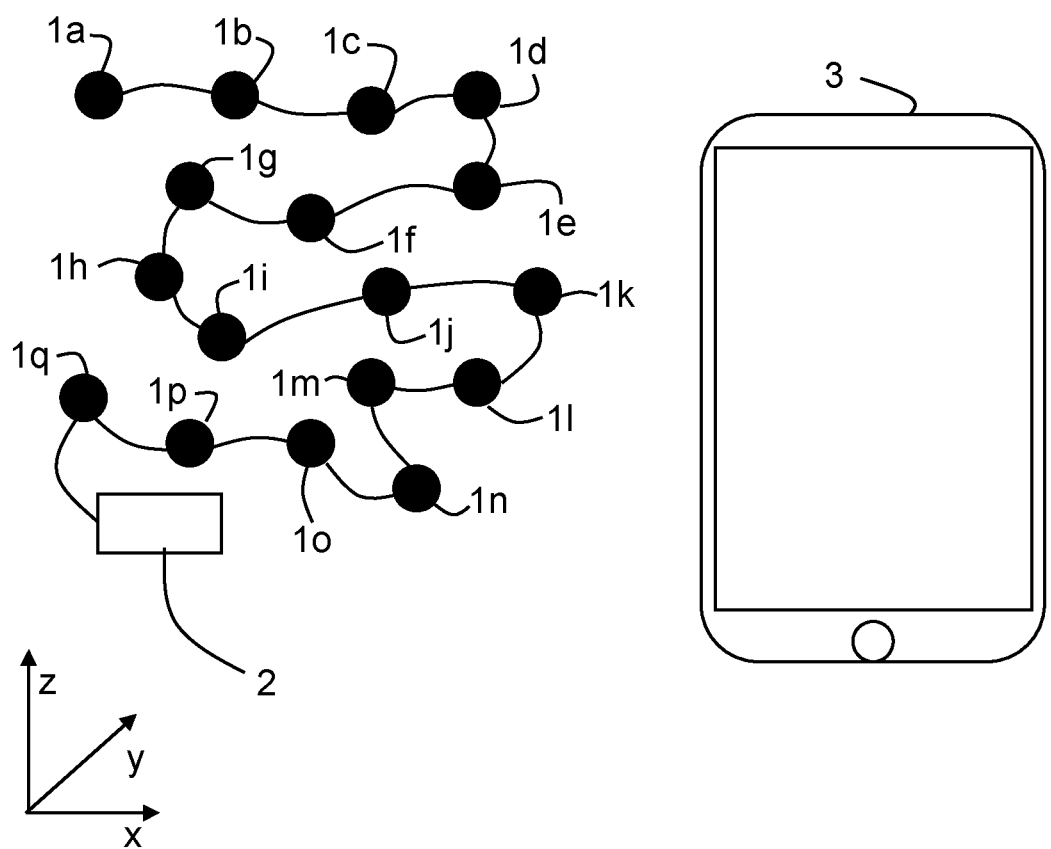
Figure 2:
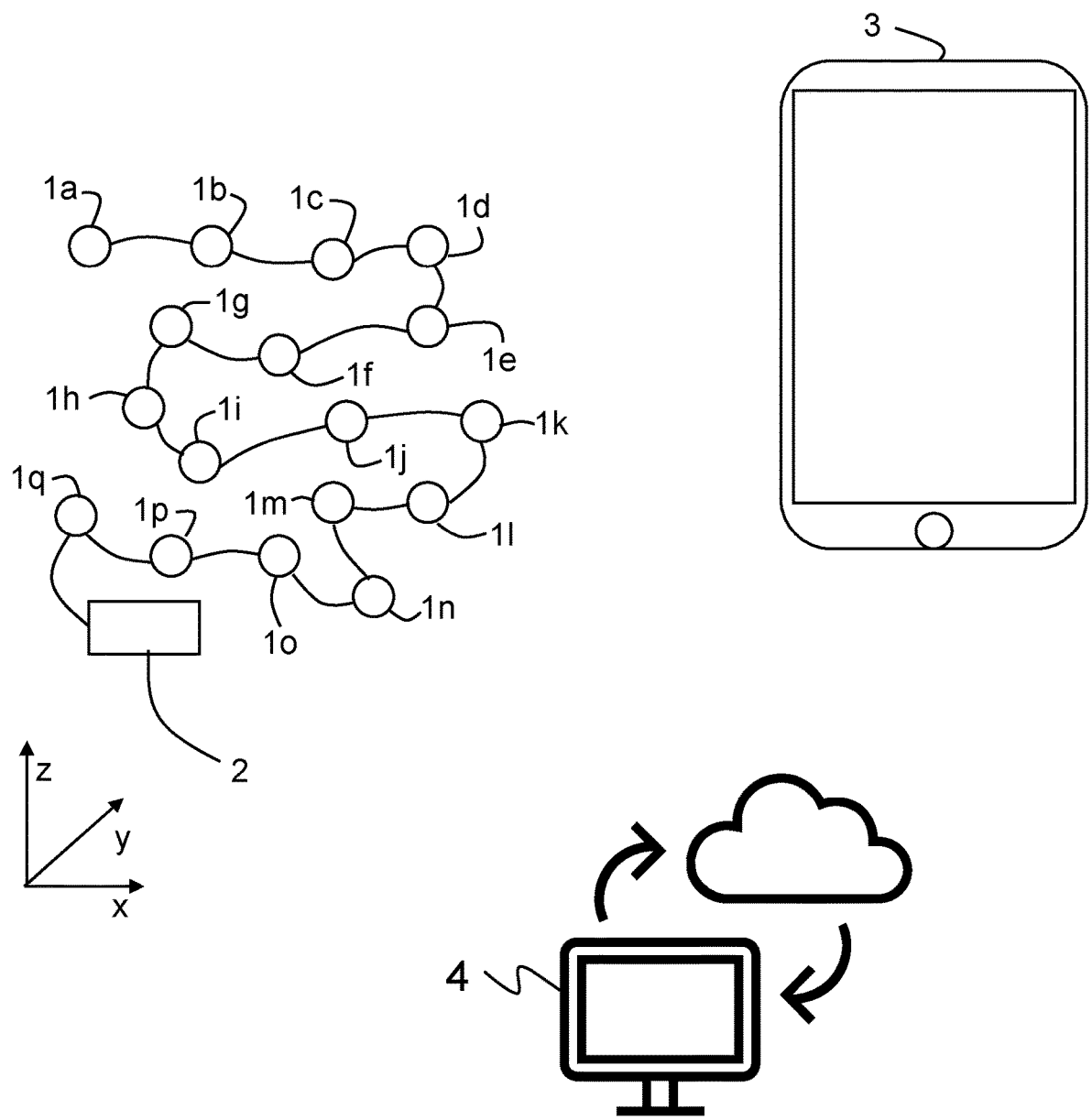
FIG. 2 shows a possible variant of the system object of the present invention.

For illustrative purposes, with reference to FIGS. 1a to 2, the LEDs which have a full colour correspond to the LEDs whose spatial coordinates have been detected, the LEDs with a vertical band correspond to the LEDs which have been detected in two two-dimensional models, the LEDs with a horizontal band correspond to the LEDs which have been detected in a two-dimensional model, while the LEDs without any colour represent the LEDs which do not appear in any two-dimensional models.

Once a sequence of images has been acquired, as described in relation to FIG. 1a, it is possible to assume that in the first acquisition of the two-dimensional model, all the LEDs have been detected, for example, with the exception of the LEDs 1m and 1i, which, being slightly hidden, have not yet been detected. Downstream of this step, the smartphone 3 sends a command to the control unit 2 which in turn will colour all the LEDs orange, and the LEDs 1m and 1i red.

Based on what has been described above, the command sent by the smartphone 3 causes all the LEDs to have horizontal bands, with the exception of the LEDs 1i and 1m which have no colour, as shown in FIG. 1b.

At this point, again with reference to FIG. 1b, the smartphone 3 is moved with respect to FIG. 1a, so as to acquire a new two-dimensional model. The colouring of the LEDs helps to position the camera so as to clearly frame all the LEDs and in particular the LEDs 1m and 1i, in order to be sure that the camera allows to detect the LEDs which were not detected in the previous two-dimensional model.

In fact, FIG. 1b shows the smartphone screen which frames all the LEDs, in particular the LEDs 1i and 1m.

Preferably, the new two-dimensional model acquisition is able to detect all the LEDs, comprising the LEDs 1m and 1i. Downstream of this step, the smartphone 3 sends a command to the control unit 2 which colours all the LEDs yellow (vertical bands) and the LEDs 1m and 1i orange (horizontal bands).

Such a condition is shown in FIG. 1c.

At this point the smartphone 3 is moved again, so as to acquire a new two-dimensional model from another viewpoint. This time the new two-dimensional model acquisition detects all the LEDs except one, the LED 1a, which from this last viewpoint is covered by the LED 1b.

Downstream of this third step, the smartphone 3 is able to determine the three-dimensional position of most of the LEDs, i.e., all but the LEDs 1a, 1m and 1i which have been identified in only two two-dimensional scans.

FIG. 1d shows such a condition: the smartphone 3 sends a command to the control unit 2 and will colour all the LEDs green (full colour) except the LEDs 1a, 1m and 1i yellow (vertical bands).

It is clear how at this point, thanks to the colouring of the LEDs, it is possible to move the smartphone 3, in order to acquire a new two-dimensional model clearly framing in particular the LEDs 1a, 1m and 1i to conclude the process.

Thanks to this latest acquisition of a new two-dimensional model which comprises the LEDs 1a, 1m and 1i from another viewpoint, the smartphone 3 is able to determine the spatial positions of all the LEDs, obtaining the configuration shown in FIG. 1e.

It is evident that the method just described can be advantageous for a high number of LEDs, i.e., for LED configurations which cannot be easily framed by the smartphone 3 in their entirety.

From what has just been described it is evident how, downstream of each scan and acquisition of a two-dimensional model, the three-dimensional model of the entire group of LEDs is recalculated, so as to obtain all the LEDs having sufficient two-dimensional scans to calculate the spatial position.

It follows that after a processing is performed after each scan which has as output a lighting configuration of the LEDs 1a-1q, i.e., it contains the instructions of the lighting states of all the LEDs, which varies from scan to scan.

Based on what has been previously reported, the method object of the present invention preferably includes the activation of the lighting devices of which three spatial coordinates have been detected according to a determined lighting state, different from the lighting devices of which two, one or no spatial coordinates have been identified.

The lighting state is therefore different based on the number of calculated spatial coordinates.

The method therefore identifies and distinguishes the lighting devices whose three-dimensional spatial position has already been detected, i.e., the three spatial coordinates, so that the acquisition of images can be limited to devices whose three-dimensional position has not yet been identified.

From what has been described above, with regard to the images 1a to 1e, the processing step is performed by the processor means present on the smartphone 3.

However, according to a possible embodiment, illustrated in FIG. 2, the system comprises a remote unit 4, such as a cloud unit, which sees to part or all of the processing of the two-dimensional models acquired by the smartphone 3.

The remote unit 4 can communicate with both the smartphone 3 and the control unit 2.

The smartphone 3 acquires the two-dimensional models and sends them to the remote unit 4, which processes such two-dimensional models to update the three-dimensional model of the positions of the LEDs 1a-1q, which changes with each two-dimensional model, and sends the configuration of the lighting states of each LED to the control unit 2.

Starting from this general concept, it is possible to envisage different embodiments.

According to a first embodiment, the smartphone 3 can see to part of the processing and share the computing burden with the remote unit 4, just as it can review instructions from the remote unit 4 and directly see to the control of the LEDs, through the unit control 2.

Finally, it is evident that, with the presence of the remote unit 4, the smartphone is not necessary, the important aspect is that there are means for acquiring the sequence of images to obtain the two-dimensional models to be transmitted to the remote unit 4.

For this reason, as previously described, it is possible to include an automated vehicle aimed at the acquisition of said sequence of images and/or at obtaining the two-dimensional models.

The presence of the smartphone 3 can be included, once the three-dimensional model of the position of all the LEDs or most of them has been created, to control the LEDs, or rather to select one or more LED lighting programs, in order to create scenographies selected or programmed by one or more users.

While the invention is susceptible to various modifications and alternative constructions, some preferred embodiments have been shown in the drawings and described in detail.

It should be understood, however, that there is no intention of limiting the invention to the specific illustrated embodiment but, on the contrary, it aims to cover all the modifications, alternative constructions, and equivalents falling within the scope of the invention as defined in the claims.

The use of "for example", "etc.", "or" refers to non-exclusive non-limiting alternatives, unless otherwise stated.

The use of "includes" means "includes but not limited to", unless otherwise stated.

The invention claimed is:

1. A method for determining the three-dimensional position of a plurality of individually controllable lighting devices, the method comprising the following steps:
    providing an arrangement of the plurality of lighting devices in an environment;
    determining two-dimensional positions of at least part of the plurality of lighting devices with respect to a single viewpoint through acquisition, by a camera, of a sequence of images of the environment in which the plurality of lighting devices is arranged and processing said sequence of images to obtain a first two-dimensional model of the two-dimensional positions of at least part of said plurality of lighting devices;
    moving the camera for determining at least a second two-dimensional model of the two-dimensional positions of at least part of the plurality of lighting devices according to at least one further viewpoint;
    processing the first and the second two-dimensional models to create a three-dimensional model,
    wherein the plurality of lighting devices are activated according to a pre-determined lighting state based on the number of two-dimensional positions detected, the moving of the camera being performed based on said pre-determined lighting state, and wherein the camera is moved such that the first and the second two-dimensional models always contain at least one of said plurality of lighting device of which at least a two dimensional position has been determined.

2. The method according to claim 1, wherein the plurality of lighting devices are activated according to different pre-determined lighting states based on the determined first and second two-dimensional models.

3. The method according to claim 1, wherein said lighting state of at least one of the plurality of lighting devices relates to the emission of light according to a certain colouring.

4. The method according to claim 1, wherein determining of each of the first and the second two-dimensional models includes an image acquisition step and a sending step to a remote central unit, wherein the remote central unit generates a lighting state configuration of each of said plurality of lighting devices.

5. The method according to claim 1, wherein the step of determining the two-dimensional positions of at least part of the plurality of lighting devices with respect to a single viewpoint comprises the following steps:
    during the acquisition of a sequence of images, switching on each of the plurality of lighting devices according to a different sequence, wherein the different sequence of each of the plurality of lighting devices allows each of the plurality of lighting devices to be uniquely identified,
    performing an analysis of the sequence of images to determine a spatial position of each of the plurality of lighting device in the environment and construction of the two-dimensional model.

6. A lighting system comprising:
    a plurality of lighting devices adapted to emit light arranged in an environment,
    a controller unit adapted to individually control the switching on of each of said plurality of lighting devices,
    a management unit of said plurality of lighting devices, wherein the management unit comprises
        an acquisition means configured to acquire a sequence of images of the environment of the plurality of lighting devices according to different viewpoints, and
        a processor means for processing the sequence of images,
    wherein the management unit is configured to detect a three-dimensional position of at least part of said plurality of lighting devices based on the processing of the sequence of images and the management unit is configured to implement a system configuration step in which the management unit determines a specific lighting state based on spatial detections acquired of said plurality of lighting devices, and
    wherein the control unit is configured to activate one, some or all of the plurality of lighting devices based on said determined lighting state.

7. The system according to claim 6, wherein said management unit comprises a portable user device, wherein the portable user device comprises at least one camera.

8. The system according to claim 6, wherein said management unit comprises a remote unit, wherein the remote unit is configured for processing said sequence of images and for communicating with said user device and/or said control unit.

9. The system according to claim 6, wherein said management unit comprises at least one automated vehicle, wherein the automated vehicle is capable of moving in space and has at least one camera.

10. A method for determining the three-dimensional position of a plurality of individually controllable lighting devices, the method comprising the following steps:
providing an arrangement of the plurality of lighting devices in an environment;
determining two-dimensional positions of at least part of an arrangement of a plurality of lighting devices provided in an environment with respect to a single viewpoint through acquisition, by a camera, of a sequence of images of the environment in which the plurality of lighting devices is arranged and processing said sequence of images to obtain a first two-dimensional model of the two-dimensional positions of at least part of said plurality of lighting devices;
moving the camera for determining at least a second two-dimensional model of the two-dimensional positions of at least part of the plurality of lighting devices according to at least one further viewpoint;
processing the first and the second two-dimensional models to create a three-dimensional model,
wherein the plurality of lighting devices are activated according to a pre-determined lighting state based on the number of two-dimensional positions detected, the moving of the camera being performed based on said pre-determined lighting state, and
wherein the camera is moved such that the first and the second two-dimensional models always contain at least one of said plurality of lighting device of which at least a two dimensional position has been determined.

11. The method according to claim 10, wherein the plurality of lighting devices are activated according to different pre-determined lighting states based on the determined first and second two-dimensional models.

12. The method according to claim 10, wherein said lighting state of at least one of the plurality of lighting devices relates to the emission of light according to a certain colouring.

13. The method according to claim 10, wherein determining of each of the first and the second two-dimensional models includes an image acquisition step and a sending step to a remote central unit, wherein the remote central unit generates a lighting state configuration of each of said plurality of lighting devices.

14. The method according to claim 10, wherein the step of determining the two-dimensional positions of at least part of the plurality of lighting devices with respect to a single viewpoint comprises the following steps:
during the acquisition of a sequence of images, switching on each of the plurality of lighting devices according to a different sequence, wherein the different sequence of each of the plurality of lighting devices allows each of the plurality of lighting devices to be uniquely identified,
performing an analysis of the sequence of images to determine a spatial position of each of the plurality of lighting device in the environment and construction of the two-dimensional model.

* * * * *